J. W. Cochran,
Machine Gun.
R. 7. 89
Reissued Mar 23, 1836
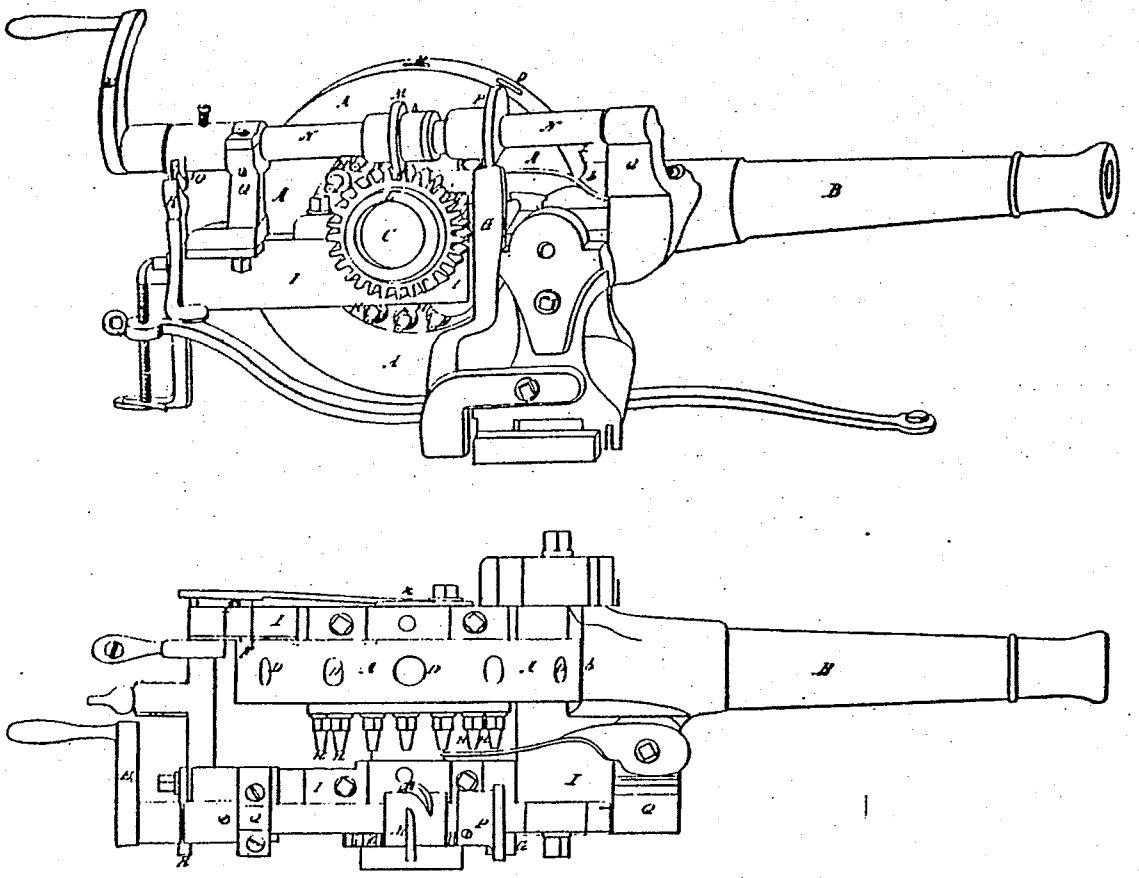

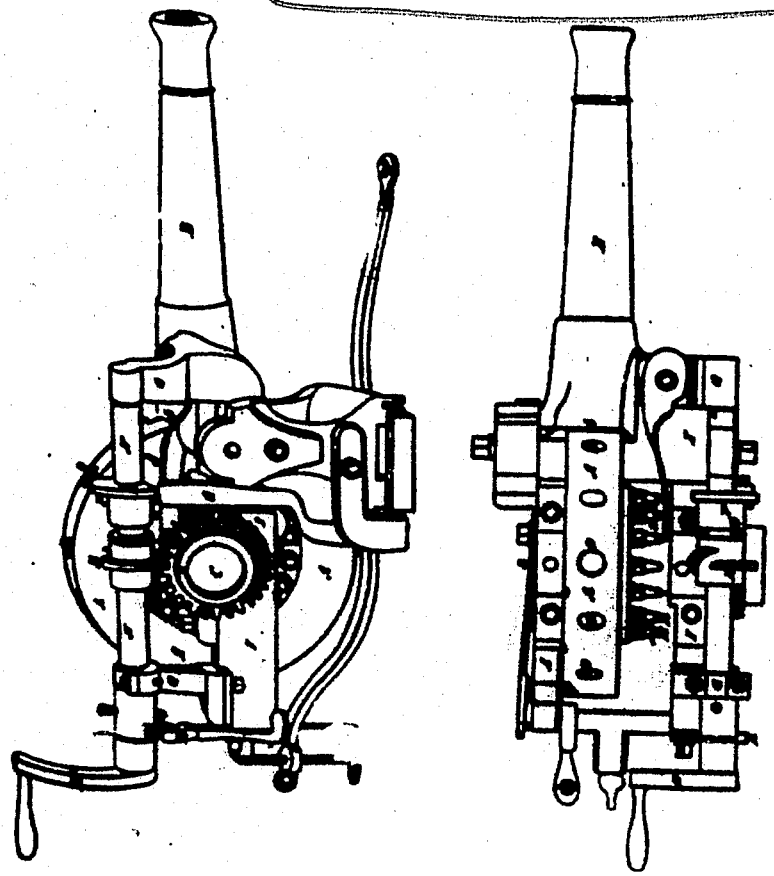

J. W. Cochran,
Machine Gun.
Reissued May 2, 1876
NO PRINTED SPECIFICATION AVAILABLE